United States Patent
Derakhshani et al.

(10) Patent No.: US 10,210,388 B2
(45) Date of Patent: *Feb. 19, 2019

(54) BIOMETRIC TEMPLATE SECURITY AND KEY GENERATION

(71) Applicant: EyeVerify Inc., Kansas City, MO (US)

(72) Inventors: Reza R. Derakhshani, Shawnee, KS (US); Vikas Gottemukkula, Kansas City, MO (US); Sashi K. Saripalle, Kansas City, MO (US); Casey Hughlett, Lenexa, KS (US)

(73) Assignee: EyeVerify Inc., Kansas City, MO (US)

(*) Notice: Subject to any disclaimer, the term of this patent is extended or adjusted under 35 U.S.C. 154(b) by 0 days.

This patent is subject to a terminal disclaimer.

(21) Appl. No.: 15/222,363

(22) Filed: Jul. 28, 2016

(65) Prior Publication Data

US 2017/0140204 A1 May 18, 2017
US 2018/0211092 A9 Jul. 26, 2018

Related U.S. Application Data

(63) Continuation of application No. 14/639,531, filed on Mar. 5, 2015, now Pat. No. 9,495,588, which is a (Continued)

(51) Int. Cl.
*G06K 9/00* (2006.01)
*G06F 21/32* (2013.01)
(Continued)

(52) U.S. Cl.
CPC ........... *G06K 9/0061* (2013.01); *G06F 21/32* (2013.01); *G06F 21/6254* (2013.01); (Continued)

(58) Field of Classification Search
CPC ................. G06K 9/0061; G06K 9/00617
See application file for complete search history.

(56) References Cited

U.S. PATENT DOCUMENTS 6,185,316 B1 2/2001 Buffam
6,836,554 B1 12/2004 Bolle et al.
(Continued)

FOREIGN PATENT DOCUMENTS

WO WO-98/25227 A1 6/1998

OTHER PUBLICATIONS

Geetika et al (NPL: "Fuzzy Vault with Iris and Retina: A Review" International Journal of Advanced Research in Computer Science and Software Engineering, vol. 3, Issue 4, Apr. 2013.*
(Continued)

*Primary Examiner* — Oneal R Mistry
(74) *Attorney, Agent, or Firm* — Goodwin Procter LLP

(57) ABSTRACT

Methods and systems for securing biometric templates and generating secret keys are provided. One or more images are received. Interest points are identified based on the received images, and a plurality of obfuscating data points are generated based on the interest points. An obfuscated template based on the interest points and the obfuscating data points is created and stored. A secret key can be encoded using a subset of at least one of the obfuscating data points and the interest points in the template.

30 Claims, 5 Drawing Sheets

Related U.S. Application Data continuation of application No. PCT/US2014/055826, filed on Sep. 16, 2014.

(60) Provisional application No. 61/902,911, filed on Nov. 12, 2013, provisional application No. 61/878,588, filed on Sep. 16, 2013.

(51) Int. Cl.
  *H04L 9/08* (2006.01)
  *H04L 9/14* (2006.01)
  *G06F 21/62* (2013.01)

(52) U.S. Cl.
  CPC ..... *G06K 9/00597* (2013.01); *G06K 9/00617* (2013.01); *H04L 9/0822* (2013.01); *H04L 9/0866* (2013.01); *H04L 9/14* (2013.01); *G06K 2009/00932* (2013.01); *G06K 2009/00953* (2013.01); *H04L 2209/04* (2013.01); *H04L 2209/16* (2013.01)

(56) References Cited

U.S. PATENT DOCUMENTS

| | | | |
|---|---|---|---|
| 7,822,238 | B2 | 10/2010 | Bolle et al. |
| 7,936,905 | B2 | 5/2011 | Takahashi et al. |
| 7,962,754 | B2 | 6/2011 | Fujii et al. |
| 8,005,277 | B2 | 8/2011 | Tulyakov et al. |
| 8,204,279 | B2 | 6/2012 | Takahashi et al. |
| 8,249,314 | B2 | 8/2012 | Bolle et al. |
| 8,290,221 | B2 | 10/2012 | Choi et al. |
| 8,355,544 | B2 | 1/2013 | Gonzalez Penedo et al. |
| 8,532,344 | B2 | 9/2013 | Connell et al. |
| 8,699,799 | B2 | 4/2014 | Moon et al. |
| 8,811,681 | B2 | 8/2014 | Watanabe |
| 8,965,066 | B1 | 2/2015 | Derakhshani et al. |
| 2003/0128867 | A1 | 7/2003 | Bennett |
| 2006/0029262 | A1 | 2/2006 | Fujimatsu et al. |
| 2007/0110283 | A1 | 5/2007 | Hillhouse et al. |
| 2007/0217708 | A1 | 9/2007 | Bolle et al. |
| 2007/0253608 | A1 | 11/2007 | Tulyakov et al. |
| 2008/0021840 | A1 | 1/2008 | Beenau et al. |
| 2008/0037833 | A1 | 2/2008 | Takahashi et al. |
| 2008/0072063 | A1 | 3/2008 | Takahashi et al. |
| 2008/0235515 | A1* | 9/2008 | Yedidia ............ G06K 9/00073 713/186 |
| 2008/0285815 | A1 | 11/2008 | Bolle et al. |
| 2009/0175508 | A1 | 7/2009 | Connell et al. |
| 2009/0262990 | A1 | 10/2009 | Choi et al. |
| 2009/0310830 | A1 | 12/2009 | Bolle et al. |
| 2010/0092048 | A1 | 4/2010 | Pan et al. |
| 2010/0232659 | A1 | 9/2010 | Rahmes et al. |
| 2010/0306550 | A1* | 12/2010 | Kevenaar ............ G06F 21/32 713/186 |
| 2010/0309303 | A1 | 12/2010 | Sanchez Ramos et al. |
| 2011/0001607 | A1 | 1/2011 | Kamakura |
| 2011/0058712 | A1 | 3/2011 | Sanchez Ramos |
| 2011/0123072 | A1* | 5/2011 | Moon ............... G06K 9/00093 382/125 |
| 2011/0126024 | A1* | 5/2011 | Beatson ............ G06F 21/32 713/186 |
| 2011/0138187 | A1 | 6/2011 | Kaga et al. |
| 2011/0182483 | A1 | 7/2011 | Du et al. |
| 2011/0200234 | A1 | 8/2011 | Takahashi et al. |
| 2012/0072723 | A1 | 3/2012 | Orsini et al. |
| 2012/0150450 | A1 | 6/2012 | Monden |
| 2013/0243267 | A1 | 9/2013 | Sezille |
| 2014/0016830 | A1 | 1/2014 | Wang et al. |
| 2014/0365782 | A1* | 12/2014 | Beatson ............ G06F 21/32 713/186 |
| 2015/0139552 | A1* | 5/2015 | Xiao ............... G06T 11/00 382/195 |

OTHER PUBLICATIONS

Yoon (NPL: "Altered Fingerprints: Analysis and Detection" IEEE Transactions on Pattern Analysis and Machine Intelligence, vol. 34, 2012).*

Meenakshi et al (NPL: "Securing Iris Templates Using Combined User and Soft Biometric based Password Hardened Fuzzy Vault" (IJCSIS) International Journal of Computer Science and Information Security, vol. 7, No. 2, Feb. 2010).*

Meenakshi et al (NPL: "Securing Revocable Iris and Retinal Templates using Combined User and Soft Biometric based Password Hardened Multimodal Fuzzy Vault" (IJCSI) International Journal of Computer Science Issues, vol. 7, Issue 5, Sep. 2010).*

Nanavati (NPL "Biometric Data Safeguarding Technologies Analysis and Best Practice", INternationa Biometric Group, Dec. 2011). (Year: 2011).*

Cavoukian, A. and Stoianov, A., "Biometric Encryption," Encyclopedia of Cryptography and Security (2nd Ed.); pp. 90-98, Oct. 26, 2011.

Choi, A. and Tran, C., "Chapter 13: Hand Vascular Pattern Technology," Handbook of Biometrics; pp. 253-270; Nov. 2007.

Didaci, L., et al., "Analysis of Unsupervised Template Update in Biometric Recognition Systems," Pattern Recognition Letters, 37:151-160, Feb. 1, 2014.

Geetika, et al "Fuzzy Vault with Iris and Retina: A Review," Int. J Advanced Res. in Computer Sci and Software Eng; 3(4):294-297; Apr. 2013.

Int'l Search Report and Written Opinion of the ISA/EP in PCT/US2014/055826; 11 pgs.; dated Dec. 12, 2014.

Invitation to Pay Additional Fees (incl. Annex to Form PCT/ISA/206 Comm Relating to the Results of the Partial Int'l Search) in PCT/US2014/055869; 6pgs.; dated Dec. 18, 2014.

Khalil-Hani, M. and Bakhteri, R, "Securing Cryptographic Key with Fuzzy Vault Based on a New Chaff Generation Method," 2010 International Conf. on High Performance Computing and Simulation (HPCS); pp. 259-265; Jun. 28-Jul. 2, 2010.

Meenakshi, V. S. and Padmavathi, G., "Security Analysis of Hardened Retina Based Fuzzy Vault," Int. Conference on Advances in Recent Technologies in Communication and Computing, 2009, ARTCom '09; pp. 926-930; Oct. 27-28, 2009.

Meenakshi, V. S. and Padmavathi, G., "Securing Iris Templates using Combined User and Soft Biometric based Password Hardened Fuzzy Vault," Int. J Computer Sci. and Information Security (IJCSIS); 7(2):1-8; Feb. 2010.

Meenakshi, V. S. and Padmavathi, G., "Securing Revocable Iris and Retinal Templates Using Combined User and Soft Biometric Based Password Hardened Multimodal Fuzzy Vault," Int. J Computer Sci. and Information Security (IJCSIS); 7(5):159-167; Sep. 2010.

Ojala, T., et al., "Multi Resolution Gray-Scale and Rotation Invariant Texture Classification with Local Binary Patterns," IEEE Transactions on Pattern Analysis and Machine Intelligence, IEEE Computer Society; 24(7):971-987; Jul. 2002.

Qamber, S., et al., "Personal Identification System Based on Vascular Pattern of Human Retina," Cairo Int. Biomedical Eng. Conference (CIBEC) 2012; pp. 64-67; Dec. 2012.

Tavakoli, H.R., et al., "Study of Gabor and Local Binary Patterns for Retinal Image Analysis," 3rd Int'l Workshop on Advanced Computational Intelligence (IWACI); pp. 527-532; Aug. 2010.

Trefny, J. and Matas, J., "Extended Set of Local Binary Patterns for Rapid Object Detection," Computer Vision Winter Workshop 2010; Feb. 3-5, 2010; 7 pgs.

Uludag, U., et al., "Biometric Template Selection and Update: A Case Study in Fingerprints," J Pattern Recognition Soc; 37(7):1533-1542, Jul. 2004.

Uludag, U., et al., "Fuzzy Vault for Fingerprints," Lecture Notes in Computer Science; 3546:310-319; Jun. 28, 2005.

Yoon, S., et al., "Altered Fingerprints: Analysis and Detection," IEEE Trans Pattern Anal Mach Intell.; 34(3):451-464; Mar. 2012.

U.S. Appl. No. 61/878,588, filed Sep. 16, 2013, Image Feature Detection, Authentication, and Information Hiding, Derakhshani et al.

U.S. Appl. No. 61/902,911, filed Nov. 12, 2013, Detection, Authentication, and Information Hiding, Derakhshani.

(56) References Cited

OTHER PUBLICATIONS

U.S. Pat. No 8,965,066, Feb. 24, 2015, Biometric Template Security and Key Generation, Derakhshani et al.
U.S. Appl. No. 14/597,329, filed Jan. 15, 2015, Biometric Template Security and Key Generation, Derakhshani et al.
U.S. Appl. No. 14/639,531, filed Mar. 5, 2015, Biometric Template Security and Key Generation, Derakhshani et al.
U.S. Pat. No. 9,390,327, Jul. 12, 2016, Feature Extraction and Matching for Biometric Authentication, Gottemukkula, et al.
U.S. Pat. No. 9,053,365 Jun. 9, 2015, Template Update for Biometric Authentication, Gottemukkula, et al.
U.S. Appl. No. 14/933,539, filed Nov. 5, 2015, Feature Extraction and Matching for Biometric Authentication, Gottemukkula, et al.
U.S. Appl. No. 14/454,148 (now U.S. Pat. No. 8,965,066), the Office Action dated Oct. 7, 2014 and Notice of Allowance dated Nov. 25, 2014.
U.S. Appl. No. 14/639,531, the Office Actions dated May 21, 2015 and Oct. 22, 2015, and Notice of Allowance dated May 6, 2016.
U.S. Appl. No. 14/274,385 (now U.S. Pat. No. 9,390,327), the Office Actions dated Nov. 21, 2014 and Mar. 6, 2015, and Notices of Allowance dated Aug. 31, 2015 and Sep. 25, 2015.
U.S. Appl. No. 14/274,398 (now U.S. Pat. No. 9,053,365), the Office Action dated Sep. 24, 2014 and Notice of Allowance dated Jan. 9, 2015.
U.S. Appl. No. 14/933,539, the Office Action dated Feb. 1, 2016 and Notice of Allowance dated May 26, 2016.

\* cited by examiner

BIOMETRIC TEMPLATE SECURITY AND KEY GENERATION

CROSS-REFERENCE TO RELATED APPLICATIONS

This application is a continuation of U.S. patent application Ser. No. 14/639,531, filed on Mar. 5, 2015, and entitled "Biometric Template Security and Key Generation," which is a continuation of International Patent Application No. PCT/US2014/055826, filed on Sep. 16, 2014, and entitled "Biometric Template Security and Key Generation," which claims priority to and the benefit of U.S. Provisional Patent Application 61/878,588, filed on Sep. 16, 2013, and entitled "Image Detection, Authentication, and Information Hiding," and U.S. Provisional Patent Application 61/902,911, filed on Nov. 12, 2013, and entitled "Detection, Authentication, and Information Hiding," the entireties of which are incorporated by reference herein.

BACKGROUND

The present disclosure relates generally to biometric authentication and, more particularly, to systems and methods for securing biometric templates and encoding and decoding keys using biometric templates.

It is often desirable to restrict access to property or resources to particular individuals. Biometric systems can be used to authenticate the identity of an individual to either grant or deny access to a resource. For example, iris scanners can be used by a biometric security system to identify an individual based on unique structures in the individual's iris. Biometric data captured from an individual, such as during an enrollment process, can be stored as a template that is used to verify the identity of the individual at a later time. Templates can be stored, for example, remotely on an authentication server or locally on a device having the ability to capture biometric readings, such as a mobile phone with a camera. However, maintaining a template in its original form or in a form from which the original template can be derived creates a risk that the security of the template will be compromised.

BRIEF SUMMARY

Systems and methods for securing biometric templates and encoding and decoding keys using biometric templates are disclosed. In one aspect, a computer-implemented method comprises: receiving one or more images; identifying a plurality of interest points based on the received images; generating a plurality of obfuscating data points based on the interest points; creating an obfuscated template based on the interest points and the obfuscating data points; and storing the obfuscated template. Other embodiments of this aspect include corresponding systems and computer programs.

In one implementation, the obfuscating data points are generated such that a spatial distribution of the interest points and a spatial distribution of the obfuscating data points are substantially similar.

In another implementation, the method further comprises associating one or more real descriptors with each interest point, wherein each real descriptor describes one or more localities surrounding the corresponding interest point.

In a further implementation, the method further comprises discarding a record of which points in the obfuscated template are the interest points.

In yet another implementation, the method further comprises encoding a key using a subset of at least one of the obfuscating data points and the interest points. Each point in the subset can be determined based on a different one of the interest points.

In another implementation, the images comprise biometric imagery. The images can comprise images of a region of an eye, each eye region image comprising a view of a vasculature of the respective eye region. The interest points can comprise vascular interest points.

In one implementation, the method further comprises associating one or more synthesized descriptors with each obfuscating data point, wherein each synthesized descriptor comprises a statistical similarity to the real descriptors.

In another implementation, the method further comprises: receiving one or more second images; identifying a second plurality of interest points based on the received second images; creating a verification template based on the second plurality of interest points; comparing the verification template with the obfuscated biometric template to identify a plurality of matching interest points; and authenticating a user based on the matching interest points. The comparing can comprise identifying the matching interest points based on one or more of the real and synthesized descriptors.

In a further implementation, the method further comprises reducing a dimensionality of the real descriptors and the synthesized descriptors. The comparing can include identifying the matching interest points based on one or more of the reduced dimensionality descriptors.

In a further implementation, the method further comprises isometrically scrambling the real descriptors and the synthesized descriptors. The comparing can further comprise identifying the matching interest points based on one or more of the scrambled descriptors.

In yet another implementation, the method further comprises decoding the key based on at least a subset of the matching interest points.

The details of one or more implementations of the subject matter described in the present specification are set forth in the accompanying drawings and the description below. Other features, aspects, and advantages of the subject matter will become apparent from the description, the drawings, and the claims.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the implementations. In the following description, various implementations are described with reference to the following drawings, in which.

DETAILED DESCRIPTION

Distinctive features of an individual's visible vasculature in the whites of the eyes can be used to identify or authenticate the individual. For example, images of the white of a user's eye can be obtained and analyzed to compare features of the eye to a biometric template in order to authenticate the user and grant or deny the user access to a resource. Implementations of solutions for imaging and pattern matching the blood vessels in the white of the eye and for feature extraction and matching are described in U.S. Pat. No. 8,369,595, issued on Feb. 5, 2013, and entitled "Texture Features for Biometric Authentication," and U.S. patent application Ser. No. 14/274,385, filed on May 9, 2014, and entitled "Feature Extraction and Matching for Biometric Authentication," the entireties of which are incorporated by reference herein.

For example, the unique structure of an individual's visible vasculature can be reflected in texture features of images of the white of the individual's eye. Images can be segmented to identify regions on the white of the eye for texture analysis, and a set of filters can be applied to determine descriptors of the texture features of the individual vasculature in these regions. A vector of descriptors derived from filter outputs can be assembled into a descriptor vector. Then, during an authentication or identification operation, the descriptor vector determined for a user can be compared to a corresponding descriptor vector from a stored biometric record for an enrolled individual to determine the likelihood of a match between the user and the enrolled individual.

Various implementations of the template security and key generation techniques described herein are based on steganographic obfuscation of a biometric template using a large or sufficient number of "chaff" or indistinguishable noise elements. A subset of the chaff elements, which are identified upon successful verification in a device-specific scrambled space, is utilized to solve a system of equations that yields an encoded secret. These tokens are high entropy, revocable, and reveal nothing about user's biological traits.

Figure 1:
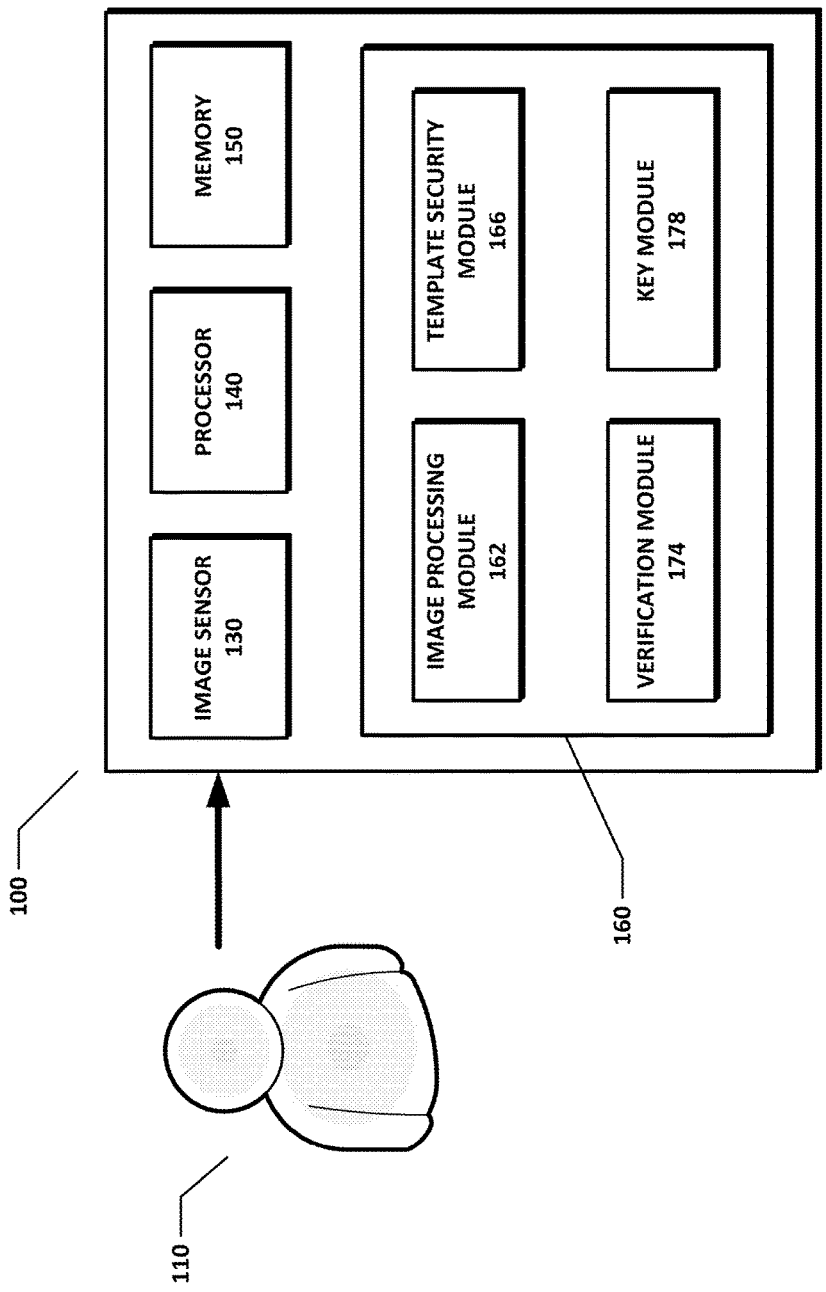
FIG. 1 depicts a diagram of a system for biometric template security and key generation according to an implementation.

FIG. 1 illustrates one implementation of a localized system for generating secure biometric templates, performing user verification, and encoding and decoding secret keys based on the biometric templates. A user device 100 can include an image sensor 130, processor 140, memory 150, biometric hardware and/or software 160, and a system bus that couples various system components, including the memory 150 to the processor 140. User device 100 can include, but is not limited to, a smart phone, smart watch, smart glasses, tablet computer, portable computer, television, gaming device, music player, mobile telephone, laptop, palmtop, smart or dumb terminal, network computer, personal digital assistant, wireless device, information appliance, workstation, minicomputer, mainframe computer, or other computing device that is operated as a general purpose computer or a special purpose hardware device that can execute the functionality described herein.

Biometric hardware and/or software 160 includes an image processing module 162 for performing operations on images captures by image sensor 130. For example, image processing module 162 can perform segmentation and enhancement on images of the eye of a user 110 to assist in isolating vascular structures. Template security module 166 creates biometric templates based on the vasculature imagery and performs various obfuscating and scrambling operations on the templates, as described herein, to increase template security while maintaining usability. Verification module 174 validates the identity of a user 110 by performing matching operations between a biometric verification template formed upon capturing a biometric reading and a previously stored enrollment template. Key module 178 can encode a secret key for the user 110 based on a biometric enrollment template and decode the key upon successful verification of the user's identity using a verification template.

Implementations of the system described herein can use appropriate hardware or software; for example, the system can execute on hardware capable of running an operating system such as the Microsoft Windows® operating systems, the Apple OS X® operating systems, the Apple iOS® platform, the Google Android™ platform, the Linux® operating system and other variants of UNIX® operating systems, and the like. The system can include a plurality of software processing modules (e.g., image processing module 162, template security module 166, verification module 174, and key module 178) stored in a memory 150 and executed on a processor 140. By way of illustration, the program modules can be in the form of one or more suitable programming languages, which are converted to machine language or object code to allow the processor or processors to execute the instructions. The software can be in the form of a standalone application, implemented in a suitable programming language or framework.

Additionally or alternatively, some or all of the functionality can be performed remotely, in the cloud, or via software-as-a-service. For example, certain functions (e.g., image processing, template creation, template matching, etc.) can be performed on one or more remote servers or other devices that communicate with user devices. The remote functionality can execute on server class computers that have sufficient memory, data storage, and processing power and that run a server class operating system (e.g., Oracle® Solaris®, GNU/Linux®, and the Microsoft® Windows® family of operating systems). Communication between servers and user devices can take place over media such as standard telephone lines, LAN or WAN links (e.g., T1, T3, 56 kb, X.25), broadband connections (ISDN, Frame Relay, ATM), wireless links (802.11 (Wi-Fi), Bluetooth, GSM, CDMA, etc.), for example. Other communication media are contemplated. The network can carry TCP/IP protocol communications, and HTTP/HTTPS requests made by a web browser, and the connection between the user devices and servers can be communicated over such TCP/IP networks. Other communication protocols are contemplated.

Method steps of the techniques described herein can be performed by one or more programmable processors executing one or more computer programs to perform functions by operating on input data and generating output. Method steps can also be performed by, and the modules can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors. Generally, a processor will receive instructions and data from a read-only memory or a random access memory or both. The essential elements of a computer are a processor for executing instructions and one or more memory devices for storing instructions and data.

Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. One or more memories can store instructions that, when executed by a processor, form the modules and other components described herein and perform the functionality associated with the components. The processor and the memory can be supplemented by, or incorporated in special purpose logic circuitry.

The system can also be practiced in distributed computing environments where tasks are performed by remote processing devices that are linked through a communications network. In a distributed computing environment, program modules can be located in both local and remote computer storage media including memory storage devices. Other types of system hardware and software than that described herein can also be used, depending on the capacity of the device and the amount of required data processing capability. The system can also be implemented on one or more virtual machines executing virtualized operating systems such as those mentioned above, and that operate on one or more computers having hardware such as that described herein.

It should also be noted that implementations of the systems and methods can be provided as one or more computer-readable programs embodied on or in one or more articles of manufacture. The program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

Figure 2:
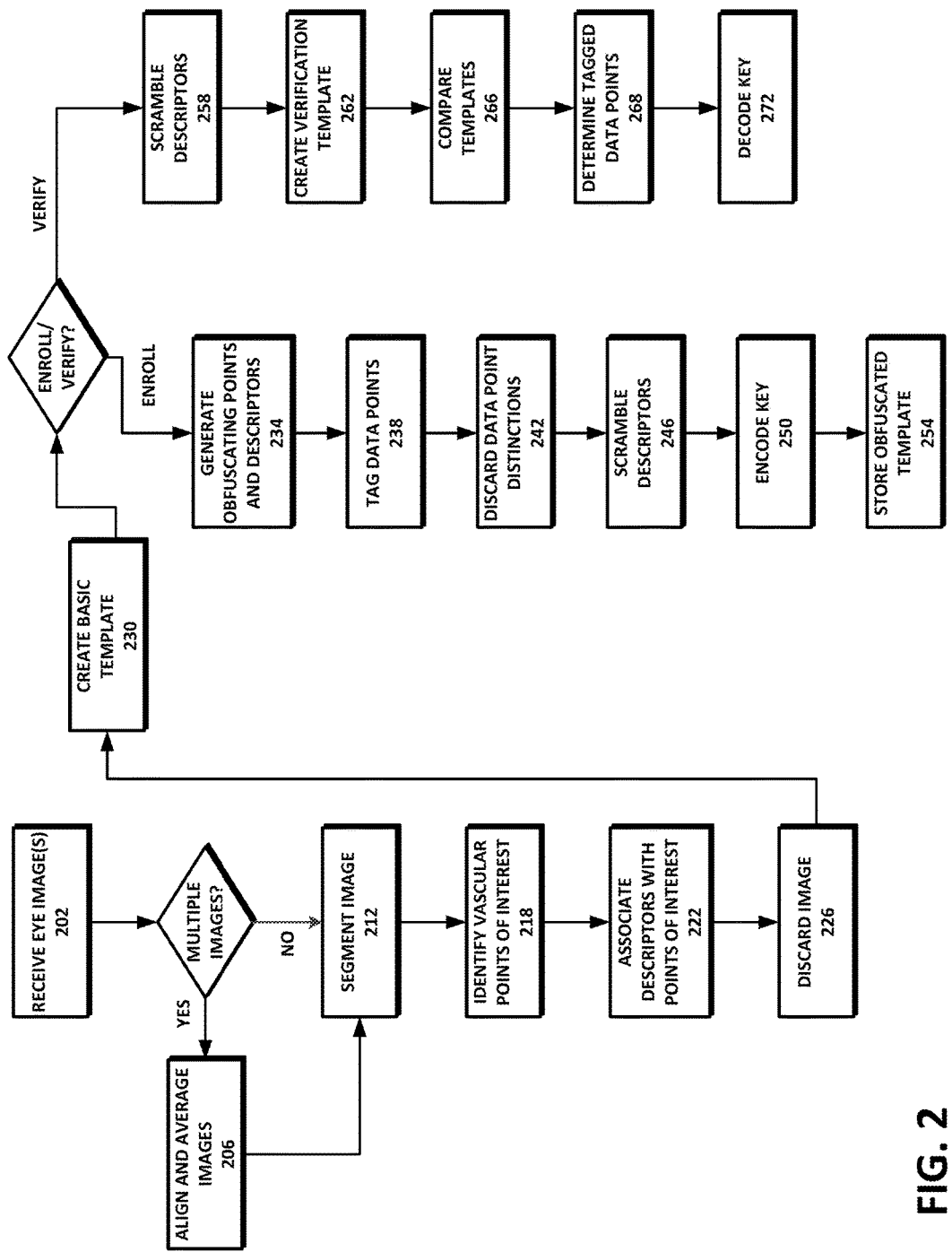
FIG. 2 depicts a method for securing a biometric template and encoding/decoding a secret key according to an implementation.

Referring to FIG. 2, in one implementation, a method for securing a biometric template starts by receiving images of a user's eye, eyes, and/or one or more regions thereof (STEP 202). The image(s) can be captured using a device 100 having an image sensor 130, e.g., a phone or tablet with a front-facing camera. If multiple images are received, a single image can be automatically selected based on its suitability for biometric identification, or some or all of the images can be automatically selected and averaged to produce a single combined image (STEP 206). The image region containing the sclera, or white of the eye, is segmented, sharpened, contrast enhanced, and/or filtered in several scales of blue-green layers, by image processing module 162, to provide an optimal depiction of vascular patterns visible in the white of the eye (STEP 212).

In STEP 218, based on the depiction of the vascular patterns, template security module 166 identifies vascular points of interest and, in STEP 222, the module 166 associates a series of image descriptors in each locality with the corresponding vascular point of interest to create a location-descriptor structure for each point of interest. At this stage, the eye image(s) can be discarded (STEP 226). The resulting set of vascular points of interest and their associated local image descriptors form a basic biometric template (STEP 230). If the template is intended for enrolling the user, the template can be saved locally on the device 100 in a private and secure manner (e.g., in memory 150), as described below.

To secure the biometric template, the template security module 166 "hides" location-descriptor structures within a number of generated "chaff" elements, or obfuscating data points, that can be similarly structured and statistically indistinguishable from actual vascular points of interest (STEP 234). Before discarding all records of the chaff vs. non-chaff (i.e., genuine vascular point of interest) elements in STEP 242, each vascular point of interest "tags" a chaff point (or another vascular point of interest) (STEP 238). Specifically, the key module 178 inputs a vascular point of interest into a secure one-way function, which designates as output a chaff point (or vascular point of interest) to be tagged. These tagged points can be used by the key module 178 to absorb and encode linear projections of a long random key (STEP 250) as well as to decode a key upon successful verification of a user's identity, as further described below.

These chaff-delegated operations further decouple various functionalities (such as surrogate biometric verification and key generation) from the genuine template elements for added privacy, security, and revocability. The template security module 166 further secures the chaff-obfuscated template in STEP 246 by scrambling the descriptors by, for example, statistical de-correlation and normalization, and/or device-specific isometric salting and dimension reshuffling, thereby ensuring that no biometrically derived information is revealed, especially if transmitted off the device 100. The verification module 174 can perform biometric template matching during identity verification in this unique device-specific and scrambled space, adding yet another layer of security, privacy, and revocability to the local matching and key generation routines. In STEP 254, the chaff-obfuscated, scrambled descriptor template is stored locally on the device (or, in other implementations, the template is stored remotely).

During verification of a user's identity, the same or similar image capture, segmentation, and enhancement steps are carried out by the image processing module 162. Similarly, vascular interest points are found and their local descriptors are calculated and then scrambled by the template security module 166 (STEP 258) using the unique device-and-software-specific signature used during enrollment, thereby creating a verification template. (STEP 262). This ensures that enrollment and verification can take place only on the same device and software instance. The matching process, in STEP 266, completed in the scrambled space by the verification module 174, identifies a minimum number of genuine vascular interest points by comparing the verification template with the obfuscated template in case of a successful genuine verification. The identified genuine vascular interest points in turn reveal a large-enough subset of the information-carrying chaff points tagged earlier in the enrollment process (STEP 268). This minimum number of genuine points and, thus, tagged chaff points, is of the same order as the key-encoding system of equations. The key module 178 can then use information from the tagged chaff points to solve for the system of equations and obtain in the decoded key (STEP 272). In one implementation, the key is stable, 512 bits long, and has an entropy of at least 64 bits.

It is to be appreciated that, although the various systems and methods presented herein utilize biometric eye imagery and interest points derived from visible vasculature, other implementations and applications of the disclosed techniques are contemplated. For example, in other implementations, features and/or points of interest are identified in other biometric image data, such as fingerprint or facial scans. Similar imaging processing procedures can be performed to enhance and isolate the interesting features/points in the imagery and, once the features/points are identified, the same or substantially similar obfuscation, scrambling, verification, and or key encoding/decoding techniques as described herein can be applied. It is of further note that the various systems and methods presented herein need not be used in conjunction with biometric imaging and authentication. Rather, the techniques disclosed herein are equally applicable to other types of images, video frames, and the like.

Enrollment

Image Capture

In one implementation, one or more eye images (and/or eye region images) are captured with an image sensor at an image quality suitable for the image processing functionality described herein, such as 720p, 1080p, or equivalent/higher resolution. The image sensor can be, for example, a one megapixel or better image sensor such as the front-facing camera generally found in cellular phones and tablets. The user's eyes can be detected using for instance Viola-Jones methods, and the user's gaze direction can be detected, all in real time. Upon detection of a stable gaze and at least one eye, a stack of images of the user's eye(s) are captured.

Spatially registered images from the input stack are averaged to lower sensor noise, and the best resulting averaged shots are selected using a reference-free image quality metric. In low or no light conditions, the backlighting of the device screen plus multi-frame noise reduction due to the aforesaid averaging enables the biometric processing operations described herein to be carried out. In one example, a number of continuous image frames (e.g., three, four, five, or more) that do not exceed an acceptable amount of variance (e.g., due to motion and blink) are registered and averaged in real time. Image stacks can be ranked using a Laplacian-of-Gaussian (LoG)-based quality metric (standard deviation of the sharpened image minus the original), and the top n are reserved for further processing (e.g., up to two for verification, up to four to six for enrollment).

Segmentation and Enhancement

Following image capture (and averaging, if performed), selected images can be color processed to better reveal blood vessels in the green-blue spectra, and segmented to delineate the white part of the eye, henceforth referred to as a region of interest (ROI). In one implementation, images are segmented by fitting multiple conic section curves to eyelids and corneal limbus boundaries. Segmentation validity is checked (e.g., the mask should be at least 40% of the bounding box of the ROI). A series of vascularity-enhancing image filtering, sharpening, and adaptive contrast manipulations provide the improved image needed for more specific biometric templates. For example, the green (red-free) layer of the images can be enhanced using contrast limited adaptive histogram equalization (CLAHE) of the LoG times the original, as well as a specially tuned bank of even Gabor filters. A series of multi-scale and specially filtered adaptations of the enhanced image can then be used for the next step.

Interest Point Detection and Feature Extraction

Figure 3:
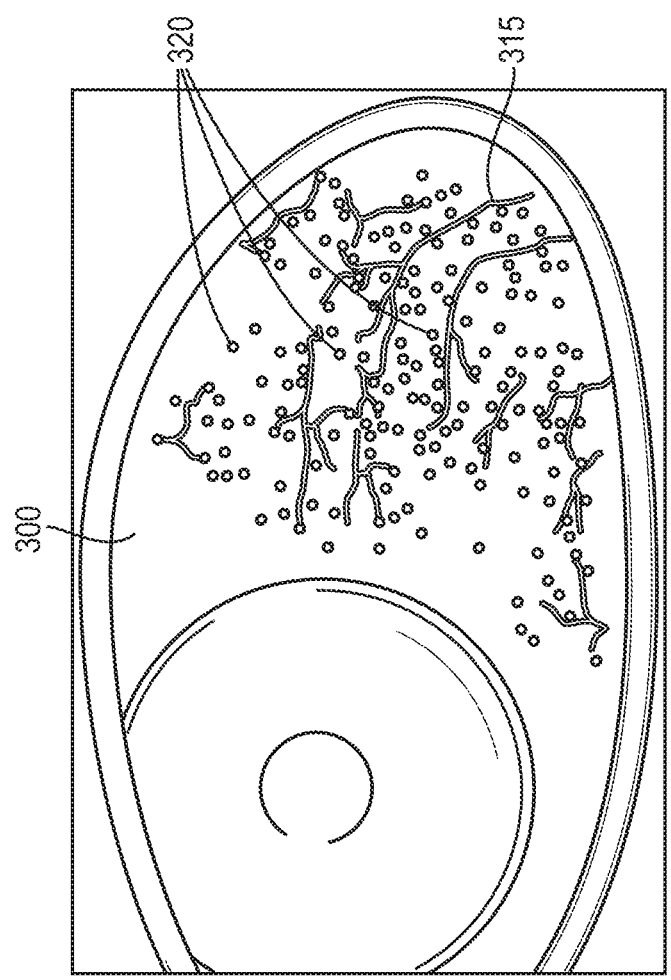
FIG. 3 depicts an ocular image with example vascular interest points.

For each ROI, locations $(x_i, y_i)$ of interest points are identified, a number typically ranging between 100-400 depending on the image quality. FIG. 3 depicts an example ocular image with identified points of interest 320 of the vasculature 315 of the eye 300. The interest points 320 can be identified using a vascular point detector such as that described in U.S. application Ser. No. 14/274,385, filed on May 9, 2014, and entitled "Feature Extraction and Matching for Biometric Authentication," the entirety of which is incorporated by reference herein. Other ways of detecting interest points are possible.

Next, a set of $\vec{V}_i^1, \vec{V}_i^2, \ldots \vec{V}_i^d$ descriptor vectors that statistically (but not exactly or uniquely) describe the local image patches around vascular interest point locations $(x_i, y_i)$ are computed. Image patch descriptor examples include, but are not limited to, Speeded Up Robust Features (SURF), (histograms of) multi-radii extended pattern local binary patterns (H LBP), and (histograms of) multi-radii extended pattern center symmetric local binary patterns (H CS LBP). For each ROI, the naive (unprotected) biometric template, $T_{VPD}$, which includes detected vascular interest points VPD, is then defined as:

$$T_{VPD}=\{t_i\}, t_i=[(x_i,y_i),\vec{V}_i^1,\vec{V}_i^2,\ldots \vec{V}_i^d], i=1,2,\ldots n(T_{VPD})$$

At the time of verification, the stored enrollment template for the claimed identity is matched against the presented verification template. In one implementation, if the similarity score is above a preset threshold, which also entails pairing of certain minimum number of elements across enrollment and verification templates, then the claimant is accepted and a match decision is issued. Note that the eye images can be immediately discarded after creation of the template, and only the enrollment templates stored.

Obfuscation and Encoding

Chaff Points Added and Tagged

In one implementation, an initial step in securing a biometric template includes hiding the to-be-stored enrollment template elements from $T_{VPD}$ among a large number of artificial synthesized elements that appear identical or substantially similar to the genuine vascular points of interest. These synthesized elements are referred to herein as "chaff" In one implementation, the number of chaff is approximate three to seven times the number of real template elements $n(T_{VPD})$. However, other multiples are contemplated. For example, higher chaff densities can provide for even higher levels of obfuscation, albeit at the expense of an added computational footprint.

Figure 4B:
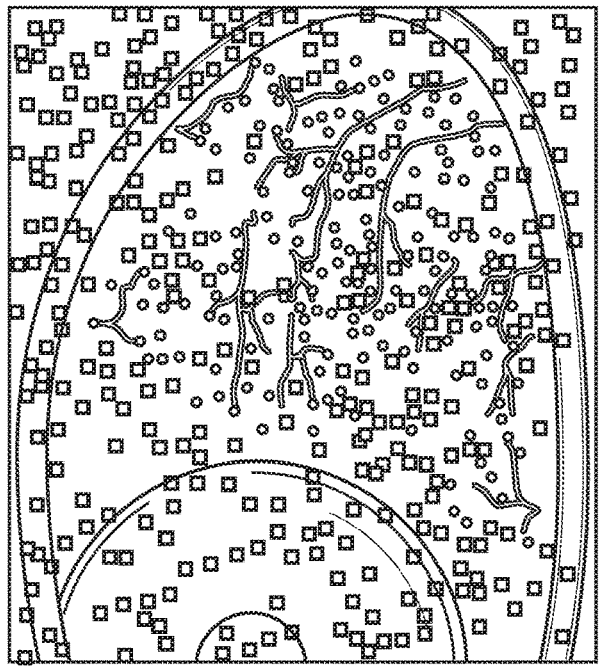
FIG. 4B depicts the obfuscated data points from FIG. 4B superimposed on the eye image of FIG. 3.
Figure 4A:
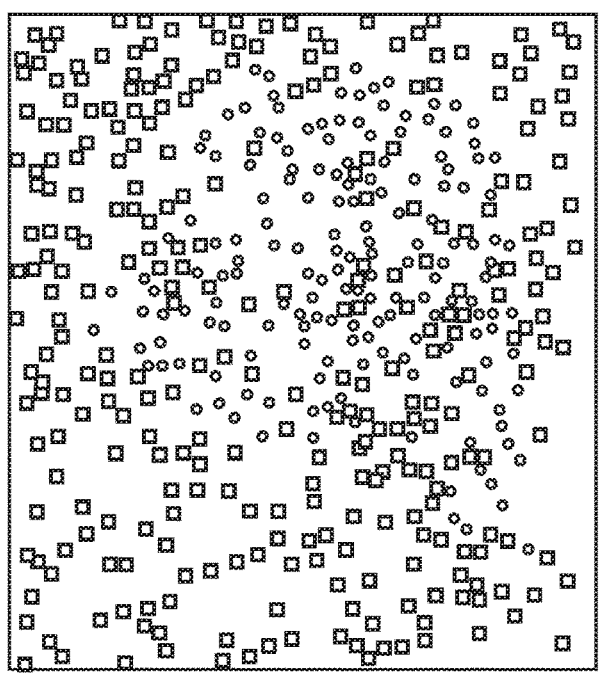
FIG. 4A depicts the vascular interest points of FIG. 3 with embedded obfuscation data points.

Chaff elements can be inserted by an algorithm that ensures spatial distribution of all data points, chaff and non-chaff (i.e., actual vascular interest points), are uniform or following the same or substantially similar pattern or distribution as the vascular interest points. In one example, local spatial densities of $(x_i, y_j)$ are about the same down to a given area granule or tile, and descriptor contents or spatial relationships do not reveal chaff from real non-chaff (actual vascular interest points) within a spatial grain. FIG. 4A depicts the vascular interest points (circles) from FIG. 3 embedded within chaff points (squares) for an approximate 3× chaff to non-chaff placement. FIG. 4B is a visualization of the obfuscated points from FIG. 4A superimposed on the original eye image from FIG. 3. Note, however, that the eye image can be discarded prior to this obfuscation stage and right after calculating $T_{VPD}$.

Each template point $t_i$, whether real (vascular interest point) or synthesized (chaff), can include two types of information: location (x, y) and patch statistics V. Spatial uniformity of the chaff-infused template for non-distinguishability of chaff data points can be achieved by several means. In one implementation, the following two-step chaff (x, y) location generation process is used. In Step 1 (coarse chaff placement): Given a typical tiling over the spatial span of the enrollment template (e.g., 4×5), start with placing the first portion of the chaff, needed to equalize the average of total template points (chaff and non-chaff) per tile, a goal number that is larger than the maximum number of VPD points in any tile. Continue until reaching about 50% of the vascular interest point VPD+chaff point density goal per tile. Use an initial minimum distance requirement (e.g., three pixels) among all data points (chaff or vascular interest point) for this coarse chaffing step. In Step 2 (fine chaff placement): Continue with inserting the rest of the chaff, reducing minimum distance threshold (e.g., to 1 pixel), until achieving 100% of the desired uniform vascular interest point VPD+chaff point density goal per tile.

In one implementation, the low end of (x, y) ranges for data point locations created by 1.2 MP cameras is about 80×100 pixels+/−20. It should be noted, however, that this number can change based on the field of view of the camera, subject distance, and other factors. The details of this method and other alternative methods are described below in the section entitled, "Sample Chaff Generation and Tagging Function Implementations."

Following chaff placement, chaff descriptor vectors $\vec{V}_i^1$, $\vec{V}_i^2$, ... $\vec{V}_i^d$ are synthesized to be similar to descriptors associated with genuine vascular interest points VPD. That is, the contents of the descriptors that are assigned to chaff points are formed to be statistically similar and indistinguishable from those derived for real interest points VPD. The aforementioned indistinguishability of chaff descriptors from real vascular descriptors can be achieved in various manner. In one implementation, to generate various chaff descriptors during enrollment, a small random circular shift and additive noise is applied to real vascular descriptors to get chaff descriptors that follow the same statistical distribution as those of their real counterparts. These features can later be "scrambled," as described below.

At the time of enrollment template creation, chaff points and their synthesized descriptors are structured as the real, VPD spanned part of the template:

$$T_{CHF} = \{t_i\}, t_i = [(x_i, y_i), \vec{V}_i^1, \vec{V}_i^2, \ldots \vec{V}_i^d], i=1,2,\ldots n(T_{CHF})$$

The chaff-infused obfuscated template is thus in form of an (unordered) set given by:

$$T_A = T_{VPD} \cup T_{CHF}$$

A "tagging" function is a one-way mapping of one template element to another. Specifically, a tagging function can be used to find or "tag" a template point in a chaff-obfuscated template given any other data point from that template. In one implementation, a tagging function $f_T$ satisfies the following properties: (1) its domain contains $\{[(x_i, y_i), \vec{V}_i^1, \vec{V}_i^2, \ldots \vec{V}_i^d]\}$; (2) it is nontrivial and many-to-one (or otherwise non-invertible or with no known or practical inverse) (e.g., based on SHA512 hash functions, which can be used in scrambling and encoding/decoding states, as well as for tagging); and (3) over the given enrollment template, the range minimally intersects with the set of vascular interest points (i.e., there is minimal self-tagging within the vascular interest point subset of the template):

$$\frac{n(f_T(VPD) \cap VPD)}{n(VPD)} \ll 1$$

Current and alternative implementations of such functions are described in the section entitled, "Sample Chaff Generation and Tagging Function Implementations." Given the nominal values for the VPD portion of the template, these tagging functions generally tag about one point at their output per each vascular interest point at their input. In one implementation, tagging functions can be used to tag a key-encoding subset of the chaff (see below), and a trust-server-signature-carrying subset of the chaff (see "Trust Server Functionality," below). These two tagging functions can include a small overlap in their ranges.

Figure 5:
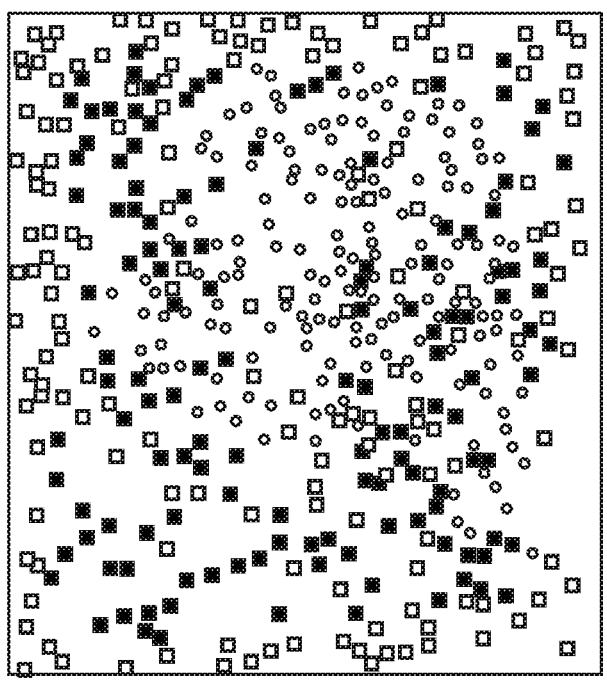
FIG. 5 depicts the vascular interest points and obfuscating data points of FIG. 4A with a subset of tagged points.

A tagging function $f_K$, such as described herein, can be used to find the template points $T_K$ into which the real $T_{VPD}$ part of the template map (mostly chaff, given the third property of tagging functions), so that $T_K = f_K(T_{VPD})$. FIG. 5 depicts the real points (circles) and obfuscated points (squares) from FIG. 4A, with a subset of tagged points (solid circles and squares). Optionally, another similar (but not identical) subset of template can be tagged using a second tagging function $f_S$, different from $f_K$ by virtue of difference in design or meta parameters, to yield $T_S = f_S(T_{VPD})$, which can be used for optional trust server functionality.

$T_K$ can then be used to encode a secret key. Note that $T_{VPD}$ is known only during the enrollment process and prior to its obfuscation in $T_{CHF}$. No record of $T_{VPD}$ is kept, and only a subset of $T_{VPD}$ is revealed during a successful genuine biometric verification.

Scramble Descriptors

In one implementation, to reduce dimensionality, improve the accuracy and speed of matching, and to de-correlate and thus further "flatten" and strengthen the uniformity of chaff-obfuscated enrollment templates, the loadings for principal component analysis (PCA) projections of different feature vectors $\{\vec{V}_i^1, \vec{V}_i^2, \ldots \vec{V}_i^d\}$, i=1, 2, ... , $n(T_A)$ are pre-calculated using a large representative training set and stored. Next, the descriptors in chaff-infused templates are reduced to a fraction of their original length, e.g., about 30%, while keeping a significant (e.g., more than 80%) of their original explained variations using Scree graph analysis. Optional variance normalization of PCA projections after mean subtraction creates whitened stored template that has a diagonal normalized covariance matrix across all its features. Given the properties of PCA, the result preserves most Euclidean distance information needed for matching. Finally, the scrambling process can use a hash of different software and device hardware signatures to seed (a) a salting process to alter the PCA-shortened features using a SHA512-derived bias vector added to all descriptors (both for enrollment and verification templates, and prior to saving for enrollment templates), and (b) seed-modulated reordering of the coordinates of the resulting feature vectors (prior to saving for enrollment templates).

Note that, in addition to the lossy PCA projection, both (a) and (b) preserve the Euclidean distance, enabling matching to proceed in a scrambled space tied to the user's device. This is a particularly notable attribute because matching in an isometric (distance-preserving) and revocable surrogate space is crucial to secure and private biometric pattern matching, and leads to two-factor authentication because both the device and the genuine user will be needed for the aforesaid biometric authentication to succeed. Not only is it unnecessary to de-scramble descriptors during matching (and thus avoid risk of exposure), but a unique software-revocable and device-specific scramble space can be spanned for each installation of the biometric authentication application.

Key Encoding

One implementation of the augmented template structure for key generation (i.e., computing a secret key as a byproduct of a biometric match) will now be described. Assume that there is a system of linear equations of order k, whose coefficients are considered a secret numerical $\vec{S}$, $(\dim(\vec{S})=k)$. During verification, k is the minimum number of vascular interest points found during a successful matching process between enrollment and verification templates of a genuine user, operating at empirical 0% false accept ratio (FAR) threshold (i.e., a decision threshold that does not admit any impostors using the largest biometric eye reading dataset available). A system of linear equations can be used to encode the key, as an ordered set of data points is not required to solve for that key (the key can be encoded directly into a system of linear equations exactly solved given the high sensitivity and specificity of eye vein pattern matching arising from their complex, intricate, and high entropy structures).

Thus, a set of data points $D=\{d_i\}$, $n(D) \geq k$ is needed to uniquely solve a system of linear equations to retrieve the encoded secret numerical vector, $\vec{S}$, made possible by a successful genuine verification leading to recovery of k equations needed to solve for k unknowns making up the key (to further enforce a standard length and strength in terms of key bit sequence flow, SHA512 can be applied to the operational version of this key to have a pattern-unpredictable 512-bit private key sequence). Note that the order of recovered matched points and thus equations does not matter. The key generation information is inter-dispersed across a subset of augmented (with descriptor projection values for function-fitting) elements of the chaff-obfuscated enrollment template, henceforth referred to as $T_{AK}$, and defined as:

$$T_{AK}=\{t_i\}, t_i=[(x_i,y_i),\vec{V}_i^1,\vec{V}_i^2,\ldots\vec{V}_i^d,\vec{Y}_i^1,\vec{Y}_i^2,\ldots\vec{Y}_i^d], i=1,2,\ldots n(T_A)$$

where $(x_i, y_j)$ are the locations of interest and chaff points i in $T_A$. The augmented part of the template is $\vec{Y}_i^1, \vec{Y}_i^2, \ldots \vec{Y}_i^d$, a collection of vectors similar to $\vec{V}_i^1, \vec{V}_i^2, \ldots \vec{V}_i^d$ in dimensionality, but with each element of Y being the projection of the corresponding element from V using a k-way vectorizing function (see "Vectorizing Functions," below) and then inner product operation with an $\vec{S}$, providing the right-hand side of the earlier mentioned system of equations (notice that each element of $\vec{V}$ encodes a different $\vec{S}$). The (collection) of secret vector $\vec{S}$ is later retrieved upon successful biometric authentication by a genuine user. The aforesaid process is described through the following encoding and decoding steps, which are enabled by tagging and vectorizing functions to enhance security and privacy while maintaining numerical stability.

Encoding Process

In one implementation, the key generation functionality is based on a successful genuine accept (true positive verification) producing at least k matched points between enrollment and verification templates, even when obfuscated by indistinguishable chaff. Thus, if a system of k equations with k unknowns is built upon this matching process, where k data points for the equation can practically only be known through successful genuine matching, then the equation and thus the key can be uniquely solved only if a true match occurs.

Note that k is a function of image quality and matcher strength, and can be increased with improvements to either, or by matching multiple ROI/templates (from enrollment and verification banks) with a same encoded key in multiple enrollment templates and taking the union of the found tagged points before solving the equation to recover the secret key.

In one example, k=40 for single glance, single comparison, 2-ROI matching, given observations over collected datasets at empirical FAR=0 threshold. Matched points are template entries that are selected after being compared with their corresponding verification counterparts through proximity of their descriptors and after rejection of outliers using a random sample consensus (RANSAC) with an affine transform hypothesis (or similar). No false accepts occur if the number of such matched template entries are k or higher (i.e., the generated or released secret is unique to each unlocking user at that threshold within the bounds of the observations). For less sensitive applications, if one assumes that the matcher is not broken or compromised, a smaller k can be used to reduce key generation false rejection ratio, assuming that a false acceptance event at key generation stage will not proceed given that the matcher is rejecting the request (that is, in cases where the match score indicates a match while the number of matched points is slightly less than k, assuming that the match score has higher sensitivity and specificity than the number of points matched).

Continuing with key generation, at the time of chaff-obfuscated template creation, $T_A = T_{VPD} \cup T_{CHF}$ is produced (there can be small overlaps between $T_{VPD}$, $T_S$, and $T_K$). $T_K$ subset of chaff, tagged by $f_K(T_{VPD})$, is provided to a function (e.g., a linear projection) that encodes one or more (random) secret keys $\vec{S}$ using contents of $T_K$ and a system of linear equations. Assume that there is (about) one tagged point $t_i \in T_K$ per each tagging vascular element from VPD subset, $i=1, 2, \ldots, n(VPD)$. Because the key-encoding process can be similar for all the different descriptor sets (e.g., SURF, histograms of LBPs, and so on), the process can be demonstrated for one generic type of such features.

Assume the simplified yet to be augmented form of $T_A = T_{VPD} \cup T_{CHF}$ (using a single type of descriptor and chaff-infused), T, is as follows:

$$T=\{t_i\}, t_i=[(x_i,y_i),\vec{V}_i]$$

If the dimensionality of $V_i$ is D, then one can encode any key matrix W, composed of D×k numbers (real or otherwise, where each row can be considered as a different key vector $\vec{S}$) as the matrix of secret keys $W_{D\times k}=[W_{jd}]$ as follows. Each scalar element of the VPD subset of feature vectors $V_i$ in $T_A$, $v_{i,d}$, d=1, 2, ... D, i=1, 2, ... n(T) is vectorized (split), using a non-obvious and non-invertible vectorizing function, into k specific values. The vectorizing (splitter) function thus performs the following:

$$\vec{X}=\vec{\varphi}(x), \dim(x)=1, \dim(\vec{X})=k$$

A lighter version without a vectorizing function, where a key vector of max dimensionality D is directly encoded as a linear combination of each $\vec{V}_i$, assuming D≥k (and thus one $Y_i$ per each augmented $\vec{V}_i$, rather than D), is also possible. However, the matrix of k-juxtaposed $\vec{V}_i$ for the decode process should not be singular.

Finally, a corresponding $y_{i,d}$ is associated and added to the input $v_{i,d}$ encoding $\vec{W}_d$ (row d of the secret key matrix W with a length of k) by:

$$y_{d,i}=f_{encode}(\vec{W}_d, v_{d,i})=\vec{W}_d \cdot \varphi(v_{d,i})$$

The aforesaid sequence is repeated for all the D dimensions of the descriptor/key set $\vec{V}_i$, $\vec{W}_d$ and all the $n(T_K)$ $f_K$-tagged elements of the template for key generation to get $\vec{Y}_i$-augmented $T_K$:$\{[(x_i, y_i), \vec{V}_i, \vec{Y}_i]\}$. Next, W is altered (minimally, by adding small noise) to arrive at $W_c$, and similar applications are made to the $f_K$-untagged portion of the template to get a complete $\{y_{i,d}\}$-augmented T in a way that its components, including $y_{i,d}$ completely blend together across tagged, untagged, chaff, and vascular elements. Multiple fake W's can be produced, each applied to a subset of $T_{AK}$ (subsets with $n(T_{VPD})$ number of elements recommended for added security).

Note that the above process is noninvertible, i.e., given $y_{i,d}$, one cannot get back to $v_{i,d}$ and $\vec{W}_d$ (for one thing, the calculation of $\vec{\varphi}(x)$ and $y_{d,i}$ are many-to-one functions and noninvertible and, further, that until the time of positive genuine verification one does not know which subset of $T_{AK}$ contains the tagged and thus W-encoded data to solve for it).

In one observational example, within datasets with a threshold of k=40 (single gaze, single comparison, 2 ROI), a false accept was unable to be produced. That is, within observational limits, no two different users generated the same key and, thus, the entropy is seemingly equal to the key length. However, this does not imply that for a much larger database of users a collision (false accept) at k=40 could not happen, in which case one may simply increase k (albeit at the expense of a possibly higher false reject ratio given the higher threshold). As for empirical false acceptance ratio evaluation, using all the 7 billion population of the earth, one can experimentally guarantee the uniqueness of a biometric key space for up to about only 36 bits ($\log_2(7 \times 10e9) = 36.03$). Given the above, at some arbitrary strict threshold for k, the level of chaff-induced obfuscation of $T_{AK}$ will eventually constitute the limit for key entropy.

Encoded keys can be changed, replaced, or revoked in multiple different ways, from changing the contents of W or the corresponding $\{Y_i\}$ to changing vectorizing functions. Tagging functions and chaff contents can also be changed to achieve the aforesaid. Some of these methods are applicable at the time of enrollment, whereas others can be applied at any time. For instance, at any time, each vector key $\vec{W}_d$ can be revoked or changed in a private, secure, and convenient way by perturbing at least $n(T_A)-k+1$ elements of $y_{d,i}$ across i, e.g., by adding a small noise vector to all the $d^{th}$ elements of $\{Y_i\}$. This changes the solution $\vec{W}_d$ without revealing its new or old contents, which can be only known upon discovering at least k elements of $T_k$ made possible by a successful verification of the genuine user. In the case of multiple enrollment templates and ROIs, the same key W can be encoded in each template so that the released key from the best/combined comparison(s) remains the same. Note that since the tagged template elements are different across these enrollments, the corresponding $\{V_i, Y_i\}$ will also be different and thus there is no attack vector arising from comparing multiple templates with the same encoded W.

Verification and Decoding

In one implementation, biometric template verification begins with image capture, segmentation and enhancement, interest point detection and feature extraction, and descriptor scrambling in the same or substantially the same manner as described above with respect to the enrollment process. On the other hand, adding and tagging chaff and key encoding apply only to the enrollment process.

Matching

During matching, the claimed identity, as represented by the stored enrollment template, can be verified by matching the enrollment template against the verification template in the same scrambled space. If successful, at least k vascular interest points from the enrollment template are correctly found as a result of the positive genuine match. This enables the key-decoding process, which is the inverse of, but is similar to, key-encoding. Decoding enables the discovered subset of $T_{AK}$ with cardinality of k or larger to compute W.

To mitigate cross-template attacks, where a resourceful attacker compromises a device, its code and logic, and gains access to multiple enrollment templates and tries to cross-match them, the attack can be thwarted by having the chaff contents across different templates within the matching distance of each other (or any significant part of the previous templates when synthesizing the chaff descriptors of each to be added to an enrollment template).

One implementation of a template matching algorithm is briefly described as follows. (1) An image pyramid is formed for a multi-scale matching process. (2) Points of interest are found using a vascular point detector. (3) Features are calculated using multi radii LBP (local binary patterns), multi radii CS-LBP (center symmetric LBP), SURF, H-LBP (histogram of LBP), and H-CS-LBP (histogram of CS-LBP) around the aforesaid points. The result is saved as a naive enrollment template (a set of (x, y) vascular point coordinates plus descriptor vectors for the image patches around them, as described above). (4) Descriptors are shortened and de-correlated using pre-calculated PCA loadings, and isometrically scrambled (device-specific salting and re-shuffling of dimensions). Matching is performed in this surrogate private space. (5) Nearest neighbor matches between enrollment and verification template points are found based on Euclidean distances of all descriptors around enrollment-verification point pairs using a weighted sum. Candidate pairs are passed to the following outlier rejection step. (6) RANSAC with affine/non-reflective similarity hypothesis is performed to find outliers under assumed geometrical transform assumption, as well as the related transformation matrix. (7) The final match score is found as a nonlinear function of the correlation of x and y coordinates of the outlier-excluded enrollment-verification matched pairs, number of found pairs (k), and recovered scale and rotation from RANSAC (or other metric summarizing deviation of the transformation matrix from identity beyond reasonable values).

Key Decoding

In one implementation, the verification template is first matched against the augmented and obfuscated enrollment template to find k or more members of $T_{VPD}$ upon successful genuine match. When using multiple ROIs or enrollment/verification templates for each biometric transaction, the first comparison to hit k matched points or higher can be used for computing the encoded W. One can also take the union of tagged augmented enrollment elements found through such multiple comparisons to achieve a higher k.

Next, using the tagging function $f_k$, k or more of the points from $T_K$ are identified. These points are on the W-encoding function $f_{encode}$ by design. Only k points are needed for an exact solution of the resulting system of equations, thus, the first k (or any other k members of the recovered $T_K$) from a successful verification process can be used. For each of the aforementioned k members of $T_K$, the respective $v_{i,d}$ is vectorized into k components using the same vectorizing (splitter) function described in "Vectorizing Functions," below. Along their corresponding $Y_d=[y_{i,d}]$, k-way vectorized $v_{i,d}$ (i=1, 2, . . . k) have enough information to find their corresponding encoded key $\vec{W}_d(w_{i,d},$ i=1, 2, . . . k) as follows: for each row d, k samples of $v_{i,d}$ (iterated over i=1, 2, . . . k) are split k ways by vectorizing function $\varphi$, above, giving rise to $[\varphi]_{k\times k}$. Key vector $\vec{W}_d$ is then found using the encoding fact:

$$[\varphi]_{k\times k}[w_d]_{k\times 1}=Y_d$$

And thus:

$$[w_d]_{k\times 1}=[\varphi]_{k\times k}^{-1}Y_d$$

Again, note that, because the k data points are used for equation-solving, order does not matter, and any subset of $T_K$ with cardinality of k will suffice. Decoding using the light version described above follows a similar logic, but without the vectorizing function.

An initial security analysis will now be described. The following assumes a compromised device where the template is decrypted, and the biometric authentication code is decompiled. Given that secret key-carrying chaff $T_K$ (with about $n(T_{VPD})$ members) are indistinguishable from the rest of the template elements, the chances of a lucky draw revealing a member of $T_K$ is about $n(T_K)/n(T_A)$. A brute force attack for guessing all the required k points, considering the independent and identically distributed nature of such guesses, to solve the system of equations assuming a stolen and unencrypted enrollment template and program logic, plus availability of a measure of success, is then about $$\left(\frac{n(T_K)}{n(T_A)}\right)^k$$

because:

$$P(guess_1 \in T_K, guess_2 \in T_K, \ldots guess_k \in T_K) = \prod_{i=1}^{k} \frac{n(T_K)-i}{n(T_A)-i} < \left(\frac{n(T_K)}{n(T_A)}\right)^k$$

Thus, the effective entropy can be calculated as:

$$\text{Entropy} = -k\log_2\left(\frac{n(T_K)}{n(T_A)}\right)$$

As an example, with k=40 minimum genuine matched points, and typical number of chaff to total template points ratio of 1/5 (about 4 chaff points per vascular interest point), the entropy is larger than 92 bits.

Note that the capacity of the system, i.e., the size of the key W, is D×k×L bits, where L is the length (in bits) of the number system used to encode W. For instance, only using SURF-128 features (the 128-dimensional version of SURF), and using unsigned 64-bit integer format to represent W (63 effective bits after discarding LSB to mitigate round off errors), the key capacity (length) is 128×36×63=290,304 bits, or about 35 KB. This is not the entropy of the system, however, as calculated earlier. To enforce a standard length and strength in terms of key bit sequence flow, SHA512 can be applied to each encoded key $W_D$. Thus, regardless of the size of $W_D$, there is a pattern-unpredictable 512-bit private key sequence.

Sample Chaff Generation and Tagging Function Implementations

Tagging and using chaff decouples ensuing functionality from (already scrambled and obfuscated) real template points and descriptors spanned by vasculature, providing added security, privacy, and revocability. The following provide more specific details on various implementations of chaff, its generation, and tagging.

Spatial Placement of Chaff

The spatially uniform or otherwise non-distinguishable-from-vascular-interest-point "chaff-infusing" can be achieved in several ways to protect stored templates (generally enrollment templates, as verification templates are generated momentarily during matching). In one example, the minimum (outlier-rejected) spatial distance between real (non-chaff) interest points is determined. Chaff points are inserted until the distance between any two points (chaff and/or vascular interest points) is about the same minimum distance. A densely chaff-infused template will offer stronger security on multiple fronts. The downside is the larger size of the chaff-obfuscated template, which can also slow down the matcher.

Another less extreme implementation is a two-step chaff insertion. More specifically, given a typical tiling over the spatial span of the enrollment template, start with placing the first portion of the chaff (needed to make the average of total template points per area granule, chaff and non-chaff, about equal), using a minimum distance requirement (e.g., three pixels) for this step, known as coarse chaff insertion. The process continues with inserting the rest of the chaff until achieving the desired chaff to non-chaff ratio, typically 3× to 7×, by relaxing the minimum distance threshold (e.g., to one pixel) (fine chaff insertion step).

A further method for chaff placement includes, using an existing template, replicating the spatial patterns of vascular points in vascular tiles over non- (or almost non-) vascular tiles (in some cases, with small naturally occurring geometric distortions) while inserting chaff at empty locations/neighborhoods, observing continuity of spatial distribution of x, y coordinates of chaff-infused template at tile boundaries, as well as overall uniform spatial density per tile.

Yet another method includes following the same vascular tree-like structure if the closest dots are too close using an L-system (Lindenmayer grammar for tree-like structures). Then chaff is added, according to L-system generated spatial patterns, to less vascular tiles, until reaching a uniform tile density across template while observing continuity at tile boundaries.

Chaff Descriptor Contents

In one implementation, the descriptor feature vectors in a template, if considered as signals, are non-ergodic processes. The statistical properties of each feature element in a chaff-infused enrollment template, also with respect to what comes before and after it, in spatial and feature space, should be the same for chaff vs. non-chaff descriptors. The distribution of inter-descriptor distances, as well as their means and covariances matrices within and across chaff and non-chaff should also be similar. The aforesaid can be achieved by PCA projection that renders descriptors (chaff and non-chaff) zero mean and uncorrelated. Within the aforesaid boundaries, chaff descriptors of locations closer to vascular points can be chosen so that they are less likely to match against each other, so that the matching accuracy does not suffer (while remaining within VPD descriptor distribution characteristics). Besides creating chaff descriptor content from existing real point descriptors (e.g., application of a small circular shift plus a small noise to VPD-associated feature vectors), the PCA projection and scrambling function will further flatten any differences between chaff and genuine descriptors. Note that scrambling salts and reorders coordinates in a device specific manner, preserving Euclidean distances for matching purposes in scrambled space only within the given unique software and hardware environment, enabling two-factor authentication during a single biometric eye scan transaction. Optional eigenvalue normalization after eigenvector projections of PCA step creates a whitened stored template that has a close to identity covariance matrix across all its features for further security.

Tagging

Tagging functions can be implemented in many different ways, such as by using hash functions. For instance, assume x, y coordinates of an interest point and its corresponding feature vectors: (1) x, y coordinates are added with the first eight elements of the local feature vector V corresponding to the respective interest point. (2) The resultant is hashed with SHA512. The resulting bit string is grouped into 64 bytes. (3) To derive tagged (output) coordinates, two sets of sequences are extracted from the aforesaid byte string by considering all odd byte locations as one sequence (Seq1, 32 bytes), and all even locations as second sequence (Seq2, 32 bytes). (4) All the bytes in Seq1 are bit-XORed to get a single byte for a tagged x coordinate. Similarly, all the bytes in Seq2 are XORed to get a single byte as a tagged y coordinate. (5) If there is a chaff point at the aforementioned location, then it will be "tagged." If not, and the nearest chaff is at a radius of r pixels (e.g., one pixel), then the selection moves to the calculated location and is tagged. If none of the above occurs, a tagged chaff point is created at this location. Different rehashing of Seq1 and Seq2 can be implemented if the x, y range is beyond 0-255.

Another approach is to use mathematical functions for tagging locations. Assume a three-step process (T1, T2, and T3 below) applied in cascade. The (x, y) coordinates of the input template point are transformed as follows:

T1:
$$x_{new} = x\sin(y)$$
$$y_{new} = x\cos(x)$$

T2:
$$x_{new} = \begin{cases} -x & \text{if } x < 1 \\ x - x_{max} & \text{if } x > x_{max} \\ 1 & \text{if } x = 0 \\ x & \text{else} \end{cases}$$

$$y_{new} = \begin{cases} -y & \text{if } y < 1 \\ y - y_{max} & \text{if } y > y_{max} \\ 1 & \text{if } y = 0 \\ y & \text{else} \end{cases}$$

$x_{max}$ and $y_{max}$ are the maximum values for spatial coordinates in the chaff-infused template.

T3:
$$x_{new} = \begin{cases} x_{max} - x & \text{if } x \text{ is odd} \\ x & \text{else} \end{cases}$$

$$y_{new} = \begin{cases} y_{max} - y & \text{if } y \text{ is odd} \\ y & \text{else} \end{cases}$$

Note that tagging functions can be cascaded or re-parameterized to change behavior across different instantiations of the biometric authentication application. Chaff placement can be limited to the ROI mask (more specifically, a union of population ROI masks, in order to hide individual eyelid contours).

Example Algorithm for Chaff Location and Content Synthesis

One implementation of an algorithm for chaff location and content synthesis is as follows. Consider there are N original (VPD) points along their respective descriptors (currently H LBP, H CS LBP, and SURF), creating the template from an image of size R×C pixels (where R is the number of rows and C is the number of columns). In one implementation, steps for calculating chaff and tag are as follows:

1. Define chaff to vascular interest point "Ratio" parameter (e.g., approximately 3.5 to 4.5).
2. Insert tagged points for each original point used for Key Generation (Key Tag):
   a. Generate a tag point within the R×C window using a first tagging function that accepts the location and descriptor information of an original point as its input.
   b. Check if the tagged location is that of an original point:
      i. If yes, do nothing.
      ii. If no, but there is a chaff point within a one pixel radius, move the chaff to the tagged location.
      iii. Otherwise no:
         1. Create a chaff point at the location generated from the first tagging function.
         2. Generate descriptors for the above point using the closest original point.
   descriptors (FineChaffDescriptor):
3. Insert tagged points for each original point used for Server HandShake (ServerTag).
   a. Generate a tag point within the R×C window using a second tagging function with the location and descriptor information of the original point.
   b. Check if the tagged point location is an original point or the KeyTag:
      i. If yes, do nothing.
      ii. If no, but there is a chaff point within a one pixel radius, move the chaff to the tagged location.
      iii. Otherwise no:
         1. Create the point generated from the second tagging function.
         2. Generate descriptors for the above point using the closest original point.
   descriptors (FineChaffDescriptor):
4. Divide the R×C into k tiles of equal size (e.g., k=20, for 4×5 tiles and R=80, C=100, +/−20). It should be noted that the foregoing values are for purposes of example, and other possible values are contemplated. Certain values can change, for example, based on image sensor (resulting image resolution).
5. Calculate the number of points (Original+KeyTags+ServerTags) in each tile and find the maximum (MaxPoints).
6. Calculate required points and change type per tile:
   a. If Number of points in a tile is less than MaxPoints/2: Do CoarseChaff until MaxPoints/2 followed by FineChaff until total points is equal to MaxPoints+/−5%. (As used in this example algorithm, +/−X % can refer to a random number within the range of −X to +X).

b. If Number of points in a tile is greater than or equal to MaxPoints/2: Do FineChaff until total points is equal to MaxPoints+/−5%.
7. For a random 20% (can be increased for higher chaff count) of the chaff generated in Step 6, create ChaffTagChaff.
   a. Generate a tag point within the R×C window using a third tagging function with the location and descriptor information of the original point.
   b. Check if the tagged point location is an original point or KeyTag or ServerTag or Chaff:
      i. If yes, do nothing.
      ii. If no, but there is a chaff point within a one pixel radius, move the chaff to the tagged location.
      iii. Otherwise no:
         1. Create the point generated from the third tagging function.
         2. Generate descriptors for the above point using the closest original point descriptors (FineChaffDescriptor).
8. If the number of (KeyTag+ServerTag+CoarseChaff+FineChaff+ChaffTagChaff)/Original points is less than Ratio: Create FineChaff.

CoarseChaff
1. Generate a random chaff point within the tile that is at least three pixels away from all points.
2. CoarseChaffDescriptor: Take the closest Original Descriptor (OrigDesc).
3. For SURF descriptors:
   a. NewSURFdescriptor=CircularShift(OrigDesc, +/−30% length)+(0.01% Gaussian noise).
   b. If normalized SSD of (OrigDesc, NewSURFdescriptor)<0.1 goto 3.a.
4. For HLBP descriptors:
   a. NewHLBPdescriptor=CircularShift(OrigDesc, +/−30% length)+(20% Gaussian noise).
   b. If normalized SSD of (OrigDesc, NewHLBPdescriptor)<0.1 goto 4.a.
5. For HDLBP descriptors:
   a. NewHCSLBPdescriptor=CircularShift(OrigDesc, +/−30% length)+(20% Gaussian noise).
   b. If normalized SSD of (OrigDesc, NewHCSLBPdescriptor)<0.1 goto 5.a.

FineChaff
1. Generate a random point within the tile that is at least 1 pixel away from all Points.
2. FineChaffDescriptor: Take the closest Original Descriptor (OrigDesc).
3. For SURF descriptors:
   3.1. NewSURFdescriptor=CircularShift(OrigDesc, +/−30% length)+(0.01% Gaussian noise).
   3.2. If normalized SSD of (OrigDesc, NewSURFdescriptor)<0.2 goto 3.1.
4. For HLBP descriptors:
   4.1. NewHLBPdescriptor=CircularShift(OrigDesc, +/−30% length)+(20% Gaussian noise).
   4.2. If normalized SSD of (OrigDesc, NewHLBPdescriptor)<0.225 goto 4.1.
5. For HDLBP descriptors:
   5.1. NewHCSLBPdescriptor=CircularShift(OrigDesc, +/−30% length)+(20% Gaussian noise).
   5.2. If normalized SSD of (OrigDesc, NewHCSLBPdescriptor)<0.225 goto 5.1.

Vectorizing Functions

A simple yet secure and efficient way to split a scalar such as $v_{i,d}$ in k ways is to provide the scalar (or a function of it) to a hash function such as SHA512, and use groups of the produced bit strings as the desired series of numbers. The reasons for using vectorizing functions are as follows: (1) numerical stability of spanned system of linear equations irrespective of descriptor content (which for instance could be very close to zero especially within constraints of the given numerical precision for several locations in a feature vector); (2) larger capacity for multiple or larger key contents, as each vector element can span its own linear mixture equation line; and (3) equation coefficients need to be calculated by the template elements at runtime, rather than just recalled from their stored values, for added security.

Another example of a vectorizing function is as follows. Other deterministic and secure vectorizing functions that result in stable non-singular solutions for the decode process are also acceptable.

Seed a pseudo random number generator (PRNG) with a function of $v_{i,d}$ and create a sequence of k pseudo random numbers. For instance, use a cryptographically secure PRNG algorithm denoted by $f_{rnd\_num\_gen}$ and seed it with $$f_{seed}(k, v_{i,d}) = \lfloor 2^{31} |\cos(kv_{i,d})| \rfloor$$

One can use more than one $v_{i,d}$ in this process, e.g., combine $v_{i,d} + v_{i,d+1}$ (or more, effectively, lowering D at the expense of reducing capacity of W) into one for added numerical stability and irreversibility.

Next, take the resulting first k pseudo random numbers, rnd_seq$_i$, i=1, 2, . . . k as the vectorized output. Thus the vectorizing function is:

$$\overrightarrow{rnd\_seq}_{i,d} = f_{rnd\_num\_gen}(f_{seed}(k, v_{i,d}))$$

Optionally, for added security and dynamic range control, one can pass the above $v_{i,d}$ spanned vectors through a nontrivial noninvertible function $\varphi(x)$. One example is as follows. Apply rnd_seq$_i$=(rnd_seq$_i$−0.5)×8 (to linearly project the random sequence to [−4, 4] to produce more unpredictable fluctuations with the following $\varphi(\cdot)$). One example for $\varphi$ (depicted below) is:

$$\varphi(x) = \tanh(x - 10)\sin\left((x - 10)e^{-\frac{x-10}{2}}\right)$$

Finally, the corresponding $y_{i,d}$ for the input $v_{i,d}$ and its associated/encoded $\overrightarrow{W}_d$ (row d of the secret key matrix W) is given by:

$$y_{d,i} = f_{encode}(\overrightarrow{W}_d, v_{d,i}) = \sum_{j=1}^{k} w_{d,j} \varphi(\text{rnd\_seq}_d(j))$$

As mentioned, using the earlier noted SHA based vectorization negates the need for these type of vectorizations.

Trust Server Functionality

In one implementation, the trust server is an optional added layer of security that can be used in conjunction with the local key approach. Another added benefit to the trust server is surrogate remote verification and template/access revocability. For instance, if the server does not recognize the token sent by the device (a unique but re-issuable byproduct of biometric eye scan matching at the time of verification), then it can send a signal to, for example, the concerned online banking service or other service using the biometric authentication, not to honor the particular requested transaction. The details of the present implementation parallels in most part the chaff tagging and template matching processes described above.

Assume that $S_{CHF}$, a hash H(.) of the descriptor part of the $T_S: \{\vec{V}_i^1, \vec{V}_i^2, \ldots \vec{V}_i^d\}$, i=1, 2, ..., $n(T_S) \rightarrow S_{CHF}$=H($\{\vec{V}_i^1, \vec{V}_i^2, \ldots \vec{V}_i^d\}$)=$\{h_i\}$, i=1, 2, ..., $n(T_S)$, is designated as the master chaff record and stored on the trust server at the time of enrollment (e.g., one master chaff record per enrollment in multi-enrollment systems). At the time of biometric verification, if the trust server validation is desired, the following "handshake" process can take place: the matched subset of template elements $T_{VER}$, is provided to $f_S$, a second chaff tagging function similar to $f_K$ but for trust server functionality, yielding $S_{VER}$=H($T_{VER}$), which is sent to the trust server at the time of verification. From the properties of the matcher, it is known that for a successful genuine match:

$$T_{VER} \cup T_{VPD}, \text{ and} \quad (a)$$

$$n(T_{VER}) \geq k \quad (b)$$

That is, a successful match finds at least k of the real vascular interest points, and a failed (e.g., impostor) match does not. Thus, it follows that the following conditions have to be met at the server side to verify the integrity of device-side match:

$$S_{VER} \subset S_{CHF} \text{ and } n(S_{VER}) \geq k$$

Note that one can also transmit a time-varying hash of $S_{VER}$, e.g., by nested repetition of SHA512 on $S_{VER}$ n times, with n being a function of a universal time stamp (e.g., a modulus). The trust server will perform the same time-varying hash of its $S_{CHF}$ before any comparisons.

Other possible functionalities of the trust server include revoking access to remote service (e.g., in case of a stolen device), as the new enrollment on the new device will create different $S_{VER}$ and $S_{CHF}$. Note that server chaff is not identical to key generation chaff and thus this separation provides partial independence and thus added security over several hypothetical attack vectors. Otherwise, verification accuracy and validation security of private key vs. server chaff could be considered to be the same.

An initial security analysis is as follows. The following scenario assumes a compromised device where the template is decrypted, the biometric authentication code is decompiled, and thus the device-server handshake logic plus template structure are known to the attacker. Given the indistinguishability of chaff and real vascular interest points, the probability of a lucky first draw from the template is at most $$\frac{n(T_S)}{n(T_A)},$$

i.e., the ratio of tagged chaff by $f_S$ (about the same as n(VPD)) divided by the total number of template elements, because:

$$P(\text{guess}_1 \in T_S, \text{guess}_2 \in T_S, \ldots \text{guess}_k \in T_S) = \prod_{i=1}^{k} \frac{n(T_S) - i}{n(T_A) - i} < \left(\frac{n(T_S)}{n(T_A)}\right)^k$$

with the assumption that such guesses are independent and identically distributed.

The chances for the attacker to be able to collect all required minimum k of $T_S$ members by guessing is exceedingly minimal. Using typical values of about one tagged chaff for each vascular interest point, and four total inserted chaff for each vascular interest point, and k=40 for a single 2-ROI scan, the chance of success at first try is:

$$\left(\frac{n(T_S)}{n(T_A)}\right)^k = 0.2^{40} = 1.1 \times 10^{-28}$$

If the trust server limits the number of failed attempts, the overall chance of success for such an attack remains very small. Furthermore, if an attacker compromises both the trust server and the user's device and deciphers all the required content, he or she cannot access the vascular interest point portion of the user template by subtracting the server master chaff record from the user device template, as $T_S$ is only a subset of $T_{CHF}$.

The terms and expressions employed herein are used as terms and expressions of description and not of limitation, and there is no intention, in the use of such terms and expressions, of excluding any equivalents of the features shown and described or portions thereof. In addition, having described certain implementations in the present disclosure, it will be apparent to those of ordinary skill in the art that other implementations incorporating the concepts disclosed herein can be used without departing from the spirit and scope of the invention. The features and functions of the various implementations can be arranged in various combinations and permutations, and all are considered to be within the scope of the disclosed invention. Accordingly, the described implementations are to be considered in all respects as illustrative and not restrictive. The configurations, materials, and dimensions described herein are also intended as illustrative and in no way limiting. Similarly, although physical explanations have been provided for explanatory purposes, there is no intent to be bound by any particular theory or mechanism, or to limit the claims in accordance therewith.

What is claimed is:

1. A computer-implemented method comprising:
    capturing, during a first time period, by a mobile device having a camera, one or more first images comprising at least one biometric characteristic of an individual;
    identifying a plurality of interest points based on the first images;
    generating a plurality of obfuscating data points based on the interest points;
    tagging one or more of the obfuscating data points using one or more of the interest points, wherein the tagging comprises providing as input to a tagging function one of the interest points and, in response to the input, receiving as output from the tagging function one of the obfuscating data points to be tagged;
    generating and encoding a key in a subset of at least one of the tagged obfuscating data points and the interest points;
    creating an obfuscated template based on the interest points and the obfuscating data points;
    storing the obfuscated template;
    capturing, during a second, later time period, by a mobile device having a camera, one or more second images comprising at least one biometric characteristic of an individual; and
    performing a biometric verification process based on the obfuscated template and the one or more second images captured during the second, later time period.

2. The method of claim 1, wherein the obfuscating data points are generated such that a spatial distribution of the interest points and a spatial distribution of the obfuscating data points are substantially similar.

3. The method of claim 1, further comprising discarding a record of which points in the obfuscated template are the interest points.

4. The method of claim 1, wherein one or more of the interest points are tagged by one or more of the interest points, and wherein generating and encoding the key comprises generating and encoding the key in a subset of at least one of the tagged obfuscating data points and the tagged interest points.

5. The method of claim 4, wherein a number of the tagged obfuscating points is greater than a number of the tagged interest points.

6. The method of claim 1, wherein each point in the subset is determined based on a different one of the interest points.

7. The method of claim 1, wherein the first images comprise images of a region of an eye, each eye region image comprising a view of a vasculature of the respective eye region, and wherein the interest points comprise vascular interest points.

8. The method of claim 1, further comprising associating one or more real descriptors with each interest point, wherein each real descriptor describes one or more localities surrounding the corresponding interest point.

9. The method of claim 8, further comprising associating one or more synthesized descriptors with each obfuscating data point, wherein each synthesized descriptor comprises a statistical similarity to the real descriptors.

10. The method of claim 9, wherein performing the biometric verification process comprises:
    identifying a second plurality of interest points based on the second images;
    creating a verification template based on the second plurality of interest points;
    comparing the verification template with the obfuscated template to identify a plurality of matching interest points; and
    authenticating a user based on the matching interest points.

11. The method of claim 10, wherein the comparing comprises identifying the matching interest points based on one or more of the real and synthesized descriptors.

12. The method of claim 10, further comprising reducing a dimensionality of the real descriptors and the synthesized descriptors.

13. The method of claim 10, wherein the comparing comprises identifying the matching interest points based on one or more of the reduced dimensionality descriptors.

14. The method of claim 10, further comprising decoding a key based on at least a subset of the matching interest points.

15. The method of claim 1, wherein each interest point is located in a respective tile of a plurality of neighboring tiles.

16. A system comprising:
    a mobile device comprising a camera, a processor, and a memory storing computer-executable instructions that, when executed by the processor, configure the mobile device to perform operations comprising:
        capturing, during a first time period, one or more first images comprising at least one biometric characteristic of an individual;
        identifying a plurality of interest points based on the first images;
        generating a plurality of obfuscating data points based on the interest points;
        tagging one or more of the interest points using one or more of the interest points, wherein the tagging comprises providing as input to a tagging function one of the interest points and, in response to the input, receiving as output from the tagging function one of the obfuscating data points to be tagged;
        generating and encoding a key in a subset of at least one of the tagged obfuscating data points and the interest points;
        creating an obfuscated template based on the interest points and the obfuscating data points;
        storing the obfuscated template;
        capturing, during a second, later time period, one or more second images comprising at least one biometric characteristic of an individual; and
        performing a biometric verification process based on the obfuscated template and the one or more second images captured during the second, later time period.

17. The system of claim 16, wherein the obfuscating data points are generated such that a spatial distribution of the interest points and a spatial distribution of the obfuscating data points are substantially similar.

18. The system of claim 16, wherein the operations further comprise discarding a record of which points in the obfuscated template are the interest points.

19. The system of claim 16, wherein one or more of the interest points are tagged by one or more of the interest points, and wherein generating and encoding the key comprises generating and encoding the key in a subset of at least one of the tagged obfuscating data points and the tagged interest points.

20. The system of claim 19, wherein a number of the tagged obfuscating points is greater than a number of the tagged interest points.

21. The system of claim 16, wherein each point in the subset is determined based on a different one of the interest points.

22. The system of claim 16, wherein the first images comprise images of a region of an eye, each eye region image comprising a view of a vasculature of the respective eye region, and wherein the interest points comprise vascular interest points.

23. The system of claim 16, wherein the operations further comprise associating one or more real descriptors with each interest point, wherein each real descriptor describes one or more localities surrounding the corresponding interest point.

24. The system of claim 23, wherein the operations further comprise associating one or more synthesized descriptors with each obfuscating data point, wherein each synthesized descriptor comprises a statistical similarity to the real descriptors.

25. The system of claim 24, wherein performing the biometric verification process comprises:
    identifying a second plurality of interest points based on the second images;
    creating a verification template based on the second plurality of interest points;
    comparing the verification template with the obfuscated template to identify a plurality of matching interest points; and
    authenticating a user based on the matching interest points.

26. The system of claim 25, wherein the comparing comprises identifying the matching interest points based on one or more of the real and synthesized descriptors.

27. The system of claim 25, wherein the operations further comprise reducing a dimensionality of the real descriptors and the synthesized descriptors.

28. The system of claim 25, wherein the comparing comprises identifying the matching interest points based on one or more of the reduced dimensionality descriptors.

29. The system of claim 25, wherein the operations further comprise decoding a key based on at least a subset of the matching interest points.

30. The system of claim 16, wherein each interest point is located in a respective tile of a plurality of neighboring tiles.

* * * * *